(12) United States Patent
Watanabe et al.

(10) Patent No.: US 7,711,981 B2
(45) Date of Patent: May 4, 2010

(54) INFORMATION PROCESSING APPARATUS, BACKUP DEVICE AND INFORMATION PROCESSING METHOD

(75) Inventors: Jun Watanabe, Fussa (JP); Hiroshi Yamazaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 76 days.

(21) Appl. No.: 12/182,766

(22) Filed: Jul. 30, 2008

(65) Prior Publication Data

US 2009/0172478 A1 Jul. 2, 2009

(30) Foreign Application Priority Data

Dec. 27, 2007 (JP) ............................. 2007-337338

(51) Int. Cl.
*G06F 11/00* (2006.01)
(52) U.S. Cl. ......................................... 714/6
(58) Field of Classification Search ....................... None
See application file for complete search history.

(56) References Cited

U.S. PATENT DOCUMENTS

| 6,341,109 | B1 | 1/2002 | Kayanuma |
| 7,007,044 | B1 * | 2/2006 | Rafert et al. ................. 707/203 |
| 7,293,068 | B2 | 11/2007 | Katsuragi et al. |
| 7,299,376 | B2 * | 11/2007 | Kodi et al. ..................... 714/6 |
| 2001/0049749 | A1 | 12/2001 | Katsuragi et al. |
| 2002/0023198 | A1 | 2/2002 | Kokubun et al. |
| 2006/0218203 | A1 | 9/2006 | Yamato et al. |
| 2007/0276782 | A1 | 11/2007 | Oshiro |

FOREIGN PATENT DOCUMENTS

| JP | 2000-228070 | 8/2000 |
| JP | 2001337939 | 12/2001 |
| JP | 2002-024071 | 1/2002 |
| JP | 2002-112314 | 4/2002 |
| JP | 2005-284474 | 10/2005 |
| JP | 2006-011903 | 1/2006 |
| JP | 2006-268740 | 10/2006 |
| JP | 2007-317028 | 12/2007 |

OTHER PUBLICATIONS

Isao Yoshino, "Backup & Recovery Re-Approach Understandable from Basics", DB Magazine, Japan, Shoeisha. Co., Ltd., Feb. 1, 2003, vol. 12 No. 16. p. 69-p. 82.

* cited by examiner

*Primary Examiner*—Michael C Maskulinski
(74) *Attorney, Agent, or Firm*—Blakely, Sokoloff, Taylor & Zafman LLP (57) ABSTRACT

According to an aspect of the present invention, there is provided an information processing apparatus including: a connector to which a backup device is connected; a data storing unit that stores an objective data; and a processor that is configured: to write the objective data to the backup device as a backup data; to record a change log that specifies an updated part of the objective data; to detect a difference part between the objective data and the backup data when the backup device is connected to the connector; to determine whether the difference part matches the updated part specified by the change log; and if the difference part does not match the updated part, to identify a mismatching part between the difference part and the updated part as an abnormal data.

9 Claims, 7 Drawing Sheets

INFORMATION PROCESSING APPARATUS, BACKUP DEVICE AND INFORMATION PROCESSING METHOD

CROSS-REFERENCE TO RELATED APPLICATIONS

This application is based upon and claims the benefit of priority from Japanese Patent Application No. 2007-337338, filed on Dec. 27, 2007, the entire contents of which are incorporated herein by reference.

BACKGROUND

1. Field

An aspect of the present invention relates to an information processing apparatus for recovering abnormal data, a backup device and an information processing method.

2. Description of the Related Art

JP-2002-24071-A discloses a data backup system including a docking base to which a personal computer is connected. In the data backup system disclosed in JP-2002-24071-A, data stored in a hard disk drive of the personal computer are backed-up in a hard disk drive of the docking base.

However, such a convention backup system has to rewrite all the data backed-up in the docking base into the personal computer if an abnormality occurs in the data stored in the personal computer, because an abnormal part of data stored in the personal computer can not be specified.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an information processing apparatus including: a connector to which a backup device is connected; a data storing unit that stores an objective data; and a processor that is configured: to write the objective data to the backup device as a backup data; to record a change log that specifies an updated part of the objective data; to detect a difference part between the objective data and the backup data when the backup device is connected to the connector; to determine whether the difference part matches the updated part specified by the change log; and if the difference part does not match the updated part, to identify a mismatching part between the difference part and the updated part as an abnormal data.

Hereinafter, preferred embodiments will be described in detail with reference to the accompanying drawings. Throughout the drawings and the detailed description, the same elements and functions are denoted by the same reference numerals and repeated explanation of which will be omitted.

Figure 1:
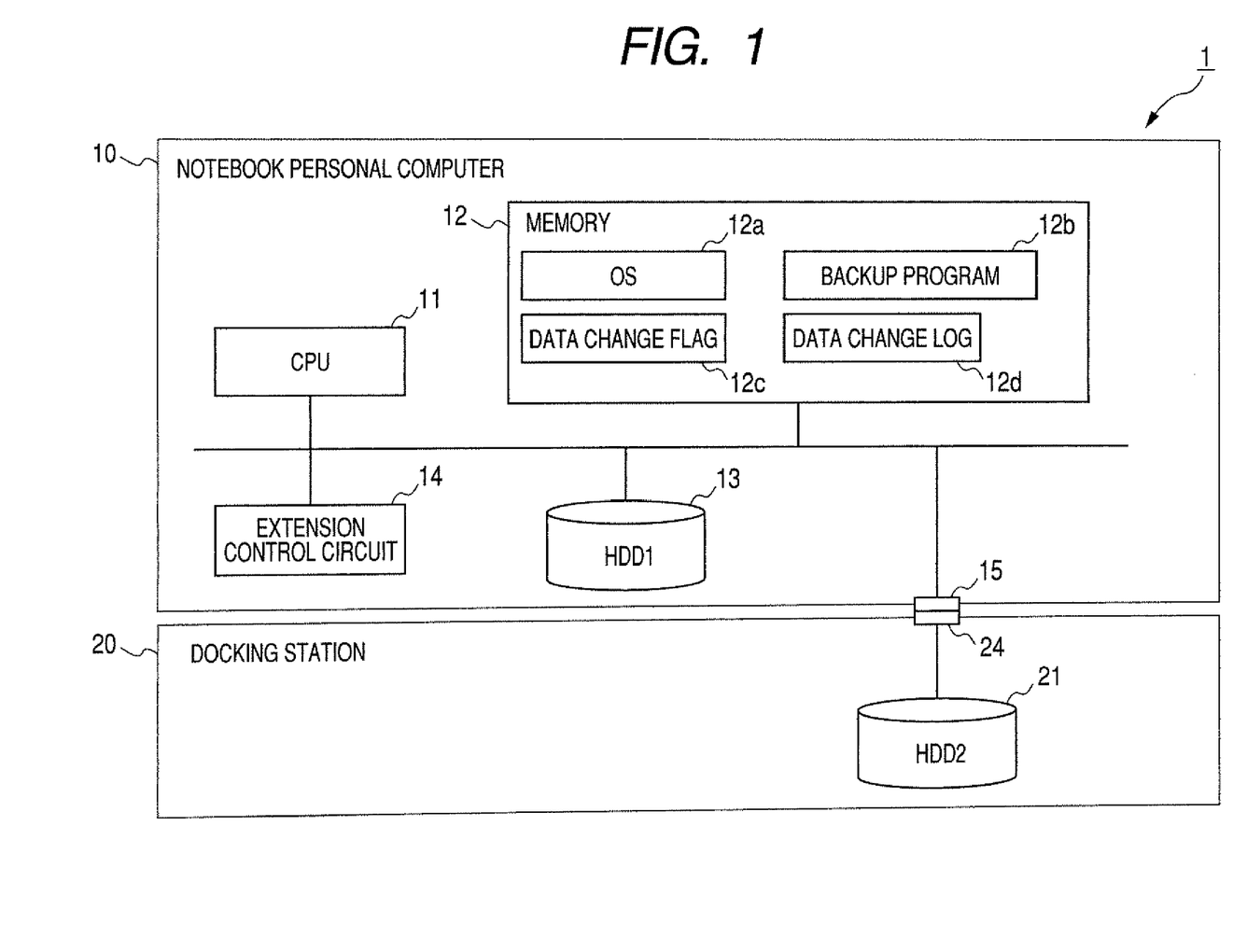
FIG. 1 is an exemplary block diagram showing a configuration of a data backup system according to a first embodiment.

FIG. 1 is a block diagram showing a main configuration of a data backup system 1 according to a first embodiment. The data backup system 1 includes an information processing apparatus 10 and a backup device 20. In this embodiment, the information processing apparatus is a notebook personal computer and the backup device 20 is a docking station as a function extension unit of the notebook personal computer 10. The docking station 20 is configured such that the notebook personal computer 10 is mounted thereon. When the notebook personal computer 10 is mounted on the docking system 20, a connector (connecting unit) 15 provided in the notebook personal computer 10 is connected to a connector (connection unit) 24 provided in the docking station 20.

The personal computer 10 includes a CPU 11, a memory 12, a first hard disk drive (HDD) 13, an extension control circuit 14, etc. In addition, although not shown, the personal computer 10 further includes a display, a keyboard, a pointing device, etc. On the other hand, the docking station 20 includes a second hard disk drive (HDD) 21. The first hard disk drive 13 is a data storing unit that stores data used in the personal computer 10 and the second hard disk drive 21 is a backup storing unit that backs up data of the first hard disk drive 13.

The CPU 11 is a processing unit that controls the operation of the personal computer 10 by executing various kinds of programs stored in the memory 12. The memory 12 temporarily stores programs, such as an operating system (OS) 12a, a backup program 12b and the like, which are read from the first hard disk drive 13. While the CPU 11 is executing the various kinds of programs, data of the first hard disk drive 13 may be rewritten and the data of the hard disk drive 13 may be altered. When the CPU 11 executes the backup program 12b, the data stored in the first hard disk drive 13 are sent to the docking station 20 via the connectors 15 and 24 and are backed up in the second hard disk drive 21 of the docking station 20.

In addition, the memory 12 stores a data change flag 12c and a data change log 12d as change information indicating that contents of the first hard disk drive 13 are changed. The data change flag 12c and the data change log 12d are information used for processing of the backup program 12b. The data change flag 12c indicates that the data of the first hard disk drive 13 are changed while the personal computer 10 is being separated from the docking station 20. In other words, the data change flag 12c indicates that the data of the first hard disk drive 13 are not synchronized (i.e., not coincided) with the data of the second hard disk drive 21.

The data change log 12d is a data change record specifying data changed in the first hard disk drive 13 when the data of the first hard disk drive 13 are changed while the personal computer 10 is being separated from the docking station 20. The data change log 12d is accumulated in the memory 12 whenever the data of the first hard disk drive 13 are changed. For example, the data change log 12d may be in correspondence to the presence or not of data change for each data storing region of a given unit, such as one sector, a plurality of sectors, a track, or the like, in the first hard disk drive 13. More specifically, the data change log 12d may correspond to 1 when there exists data change for each data storing region of the given unit and 0 when there exists no data change.

The extension control circuit 14 monitors a state of connection of the personal computer 10 to the docking station 20 and detects connection of the personal computer 10 to the docking station 20 and separation of the personal computer 10 from the docking station 20. The extension control circuit 14 informs the CPU 11 (more particularly, the operating system 12a) of events occurring depending on the connection state of the personal computer 10.

The data stored in the first hard disk drive 13 are managed using logical addresses and physical addresses. That is, the first hard disk drive 13 stores a plurality of data parts that include file data, program data and so on and correspond to the logical addresses and the physical addresses. When the CPU 11 executes a program, the CPU 11 specifies each data part based on the logical addresses and reads each data part from a data storing region of the physical addresses corresponding to the logical addresses. In addition, likewise, the data stored in the second hard disk drive 21 are managed using logical addresses and physical addresses.

In addition, in the backup of the data of the first hard disk drive 13, the first hard disk drive 13 and the second hard disk drive 21 include a RAID (Redundant Arrays of Independent (Inexpensive) Disks) 1. That is, the data of the first hard disk 13 are mirrored and stored in the second hard disk drive 21.

When a user carries the personal computer 10, if the user drops the personal computer 10 or has it collided with an adjacent thing by mistake, the personal computer 10 may be shocked, which may lead to physical damage to some portions of the first hard disk drive 13 and thus may result in loss of some of the data stored in the first hard disk drive 13. In addition, when the CPU 11 is executing a program, in some cases, the data stored in the first hard disk drive 13 may be changed without any intention. To cope with such situations, the CPU 11 of the personal computer 10 performs a data recovery process to deal with abnormality of some of the data stored in the first hard disk drive 13. The data recovery process is introduced as part of the backup program.

Figure 2:
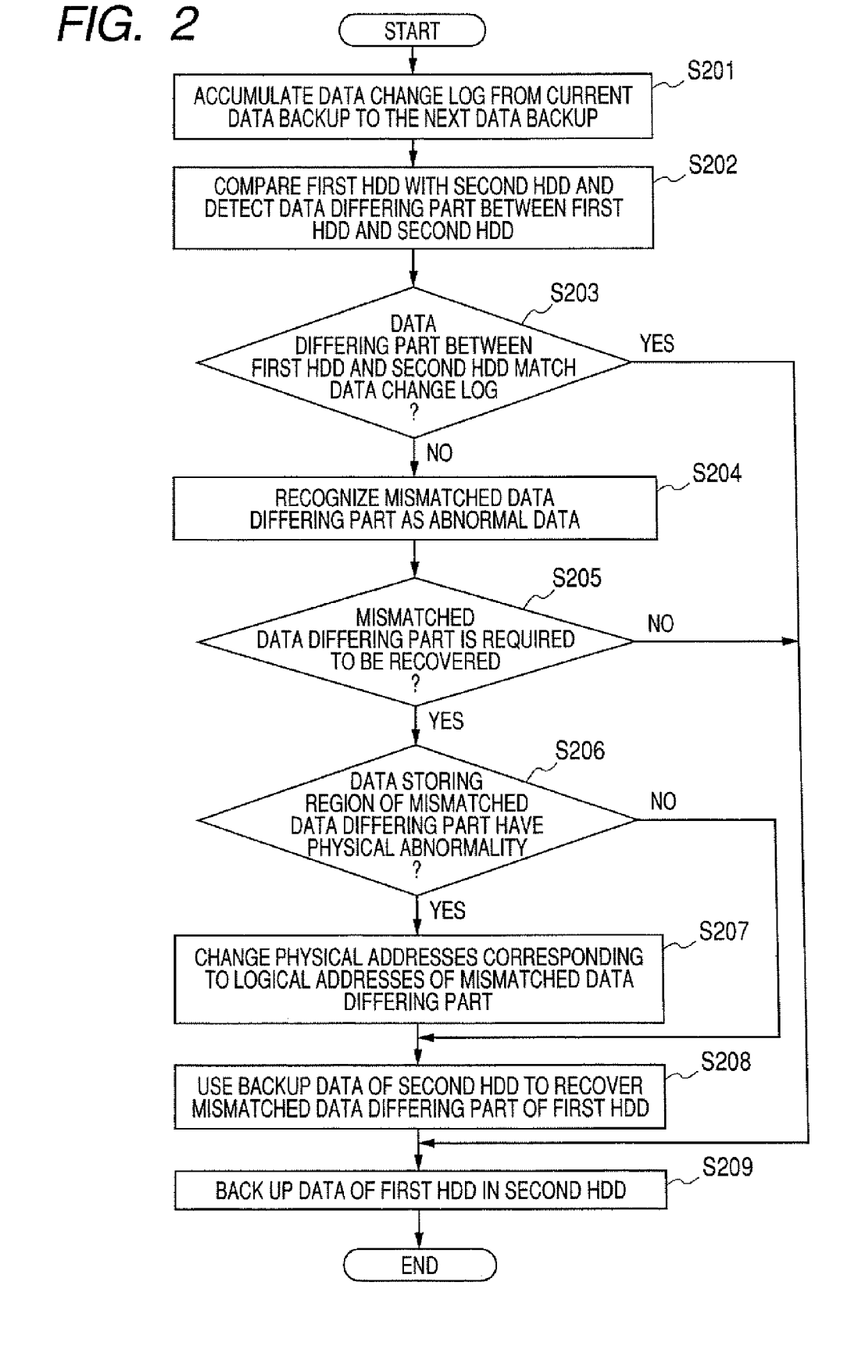
FIG. 2 is an exemplary flow chart showing a process of the data backup system according to the first embodiment.

FIG. 2 shows a data recovery process performed by the personal computer 10. The data recovery process will be described in detail with reference to FIG. 2.

When the personal computer 10 is connected to the docking station 20, the backup program 12b is executed by the CPU 11 and accordingly the data of the first hard disk drive 13 are backed up into the second hard disk drive 21. Thereafter, the personal computer 10 is separated from the docking station 20 and is used alone. While the personal computer 10 is being used alone, the CPU 11 generates and accumulates a data change log specifying the data changed in the first hard disk drive 13 whenever the data of the first hard disk drive 13 is rewritten (S201). The CPU 11 continues to accumulate the data change log until the next data backup.

Figure 3:
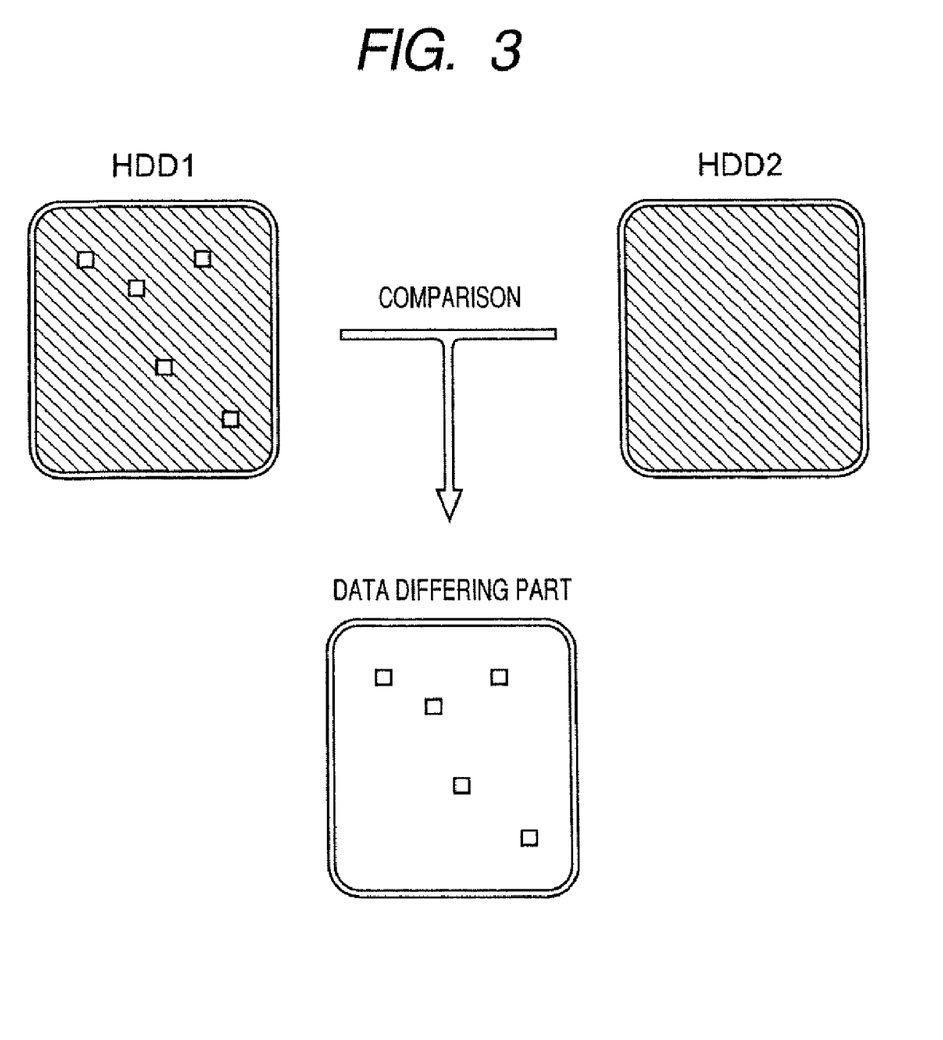
FIG. 3 is an exemplary first schematic view for explaining the process of the data backup system according to the first embodiment.

When the personal computer 10 is again connected to the docking station 20, the CPU 11 automatically executes the backup program. At this time, the CPU 11 compares the data of the first hard disk drive 13 with the data of the second hard disk drive 21 and detects and extracts a difference between the data of the first hard disk drive 13 and the data of the second hard disk drive 21 (S202). FIG. 3 shows an example of extraction of a data differing part conceptually. The number of data differing parts may be one or more.

Next, the CPU 11 determines whether the data differing part matches the data change log (S203) In other words, the CPU 11 determines whether there exist a difference between data that should not be changed according to the data change log and data that actually have been changed. Here, if the data differing part matches the data change log, it may be said that the data differing part occurs when the data of the first hard disk drive 13 is normally rewritten, i.e., that no abnormality has occurred in the first hard disk drive 13. On the other hand, if the data differing part does not match the data change log, it may be said that the data differing part is attributable to abnormality of storage elements of the first hard drive 13 or abnormal rewriting of the data of the first hard disk drive 13.

Figure 4:
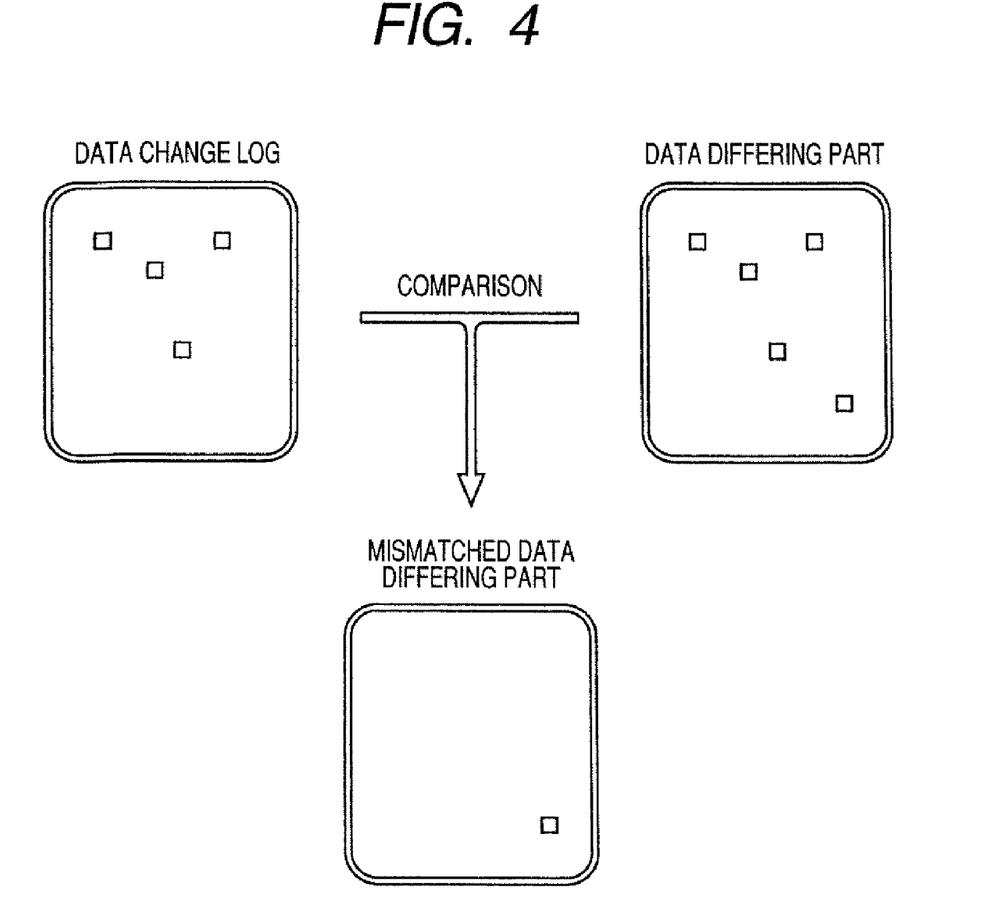
FIG. 4 is an exemplary second schematic view for explaining the process of the data backup system according to the first embodiment.

When the data differing part matches the data change log, the CPU 11 proceeds to Step 209 where the data of the first hard disk drive 13 is backed up in the second hard disk drive 21 (5209), and then the process is terminated. On the other hand, when the data differing part does not match the data change log, the CPU 11 proceeds to Step 204 where a mismatched one of the data differing part is recognized as abnormal data (S204). FIG. 4 shows an example of determination and recognition of a mismatched data differing part conceptually Next, the CPU 11 inquires whether the mismatched data differing part as abnormal data is required to be recovered (S205). More specifically, the CPU 11 displays, on the display, a selection screen for causing a user to select whether to recover or neglect the abnormal data. For example, the selection screen includes a button for selecting recovery of the abnormal data and a button for selecting negligence of the abnormal data. If the user selects the recovery of the abnormal data, the CPU 11 proceeds to Step 206. On the other hand, if the user selects the negligence of the abnormal data, the CPU 11 proceeds to Step 209 where the data of the first hard disk drive 13 is backed up in the second hard disk drive 21 (S209), and then the process is terminated.

In Step 206, the CPU 11 determines whether a data storing region storing the mismatched data differing part has a physical abnormality (S206). For example, the CPU 11 attempts to rewrite data of the data storing region in order to determine the presence or absence of a physical abnormality in the data storing region. Here, if the rewriting of data of the data storing region is unsuccessful, it may be assumed that the data storing region has a physical abnormality. On the other hand, if the rewriting of data of the data storing region is successful, it may be assumed that the data storing region has no physical abnormality. If the data storing region storing the mismatched data differing part has a physical abnormality, the CPU 11 proceeds to Step 207. On the other hand, if the data storing region storing the mismatched data differing part has no physical abnormality, the CPU 11 proceeds to Step 208.

Figure 5:
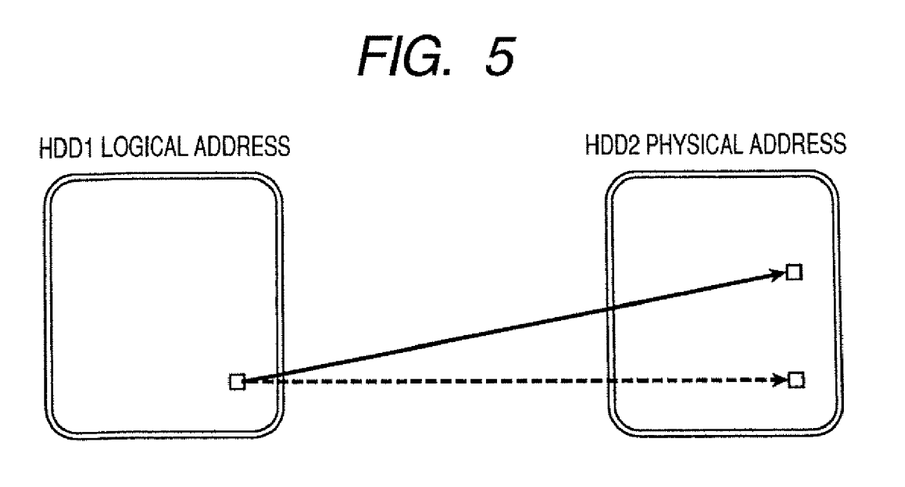
FIG. 5 is an exemplary third schematic view for explaining the process of the data backup system according to the first embodiment.

In Step 207, the CPU 11 changes physical addresses corresponding to logical addresses of the mismatched data differing part (S207). That is, since some of the data storing region of the first hard disk drive 13 is a surplus part which is not used to store file data, program data and so on, physical addresses of the surplus part of the data storing region corresponds to logical addresses of the mismatched data differing part. FIG. 5 shows an example of change of the physical addresses corresponding to the mismatched data differing part conceptually.

Figure 6:
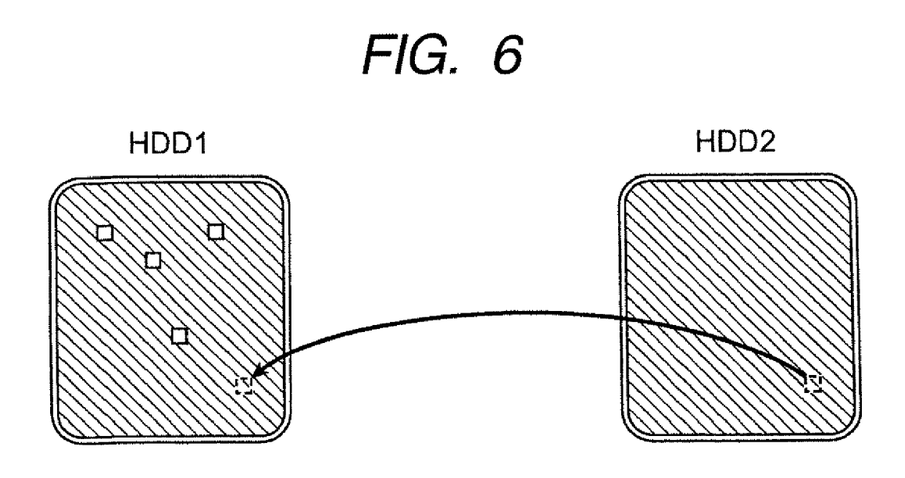
FIG. 6 is an exemplary fourth schematic view for explaining the process of the data backup system according to the first embodiment.

In Step 208, the CPU 11 uses backup data of the second hard disk drive 21 to recover the mismatched data differing part of the first hard disk drive 13 (S208). That is, the CPU 11 reads some of the backup data corresponding to the mismatched data differing part from the second hard disk drive 21 and then writes some of the backup data in the physical addresses newly corresponding to the mismatched data differing part in the first hard disk drive 13. This process allows the mismatched data differing part of the first hard disk drive 13 to be recovered. FIG. 6 shows an example of recovery of the mismatched data differing part conceptually. The first hard disk drive 13 after being recovered matches the data change log.

In Step 209, the CPU 11 mirrors the data of the first hard disk drive 13 in order to generate the backup data in the second hard disk drive 21 (S209). This mirroring allows a copy of the data stored in the first hard disk drive 13 of the personal computer 10 to be generated in the second hard disk drive 21 of the docking station 20.

Figure 7:
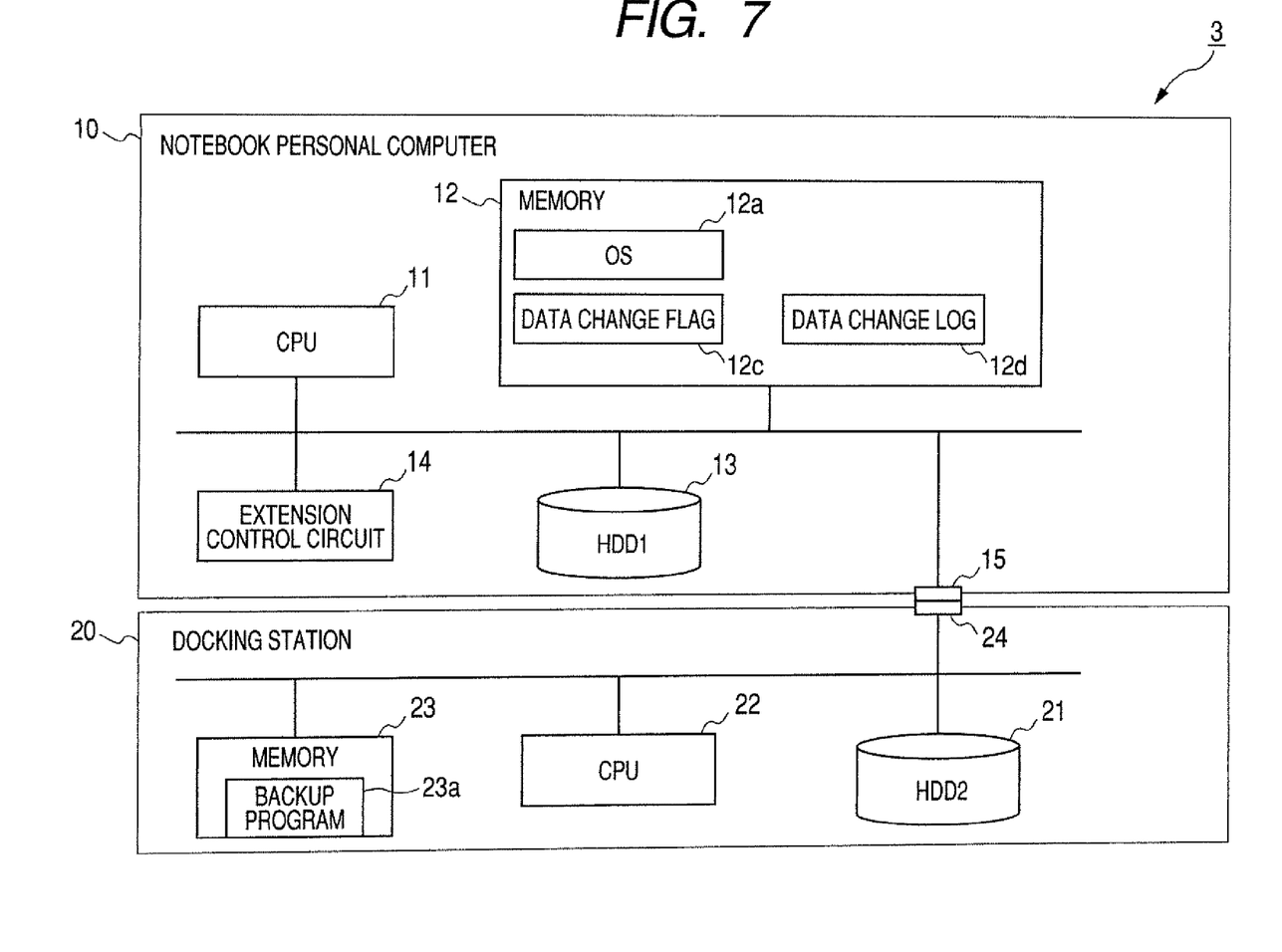
FIG. 7 is an exemplary block diagram showing a configuration of a data backup system according to a second embodiment.

FIG. 7 is a block diagram showing a main configuration of a data backup system 1 according to a second embodiment. A personal computer 10 includes a CPU 11, a memory 12, a first hard disk drive 13, an extension control circuit 14, etc. In addition, although not shown, the personal computer 10 further includes a display, a keyboard, a pointing device, etc. On the other hand, a docking station 20 includes a CPU 22, a memory 23, a second hard disk drive 21, etc.

Figure 8:
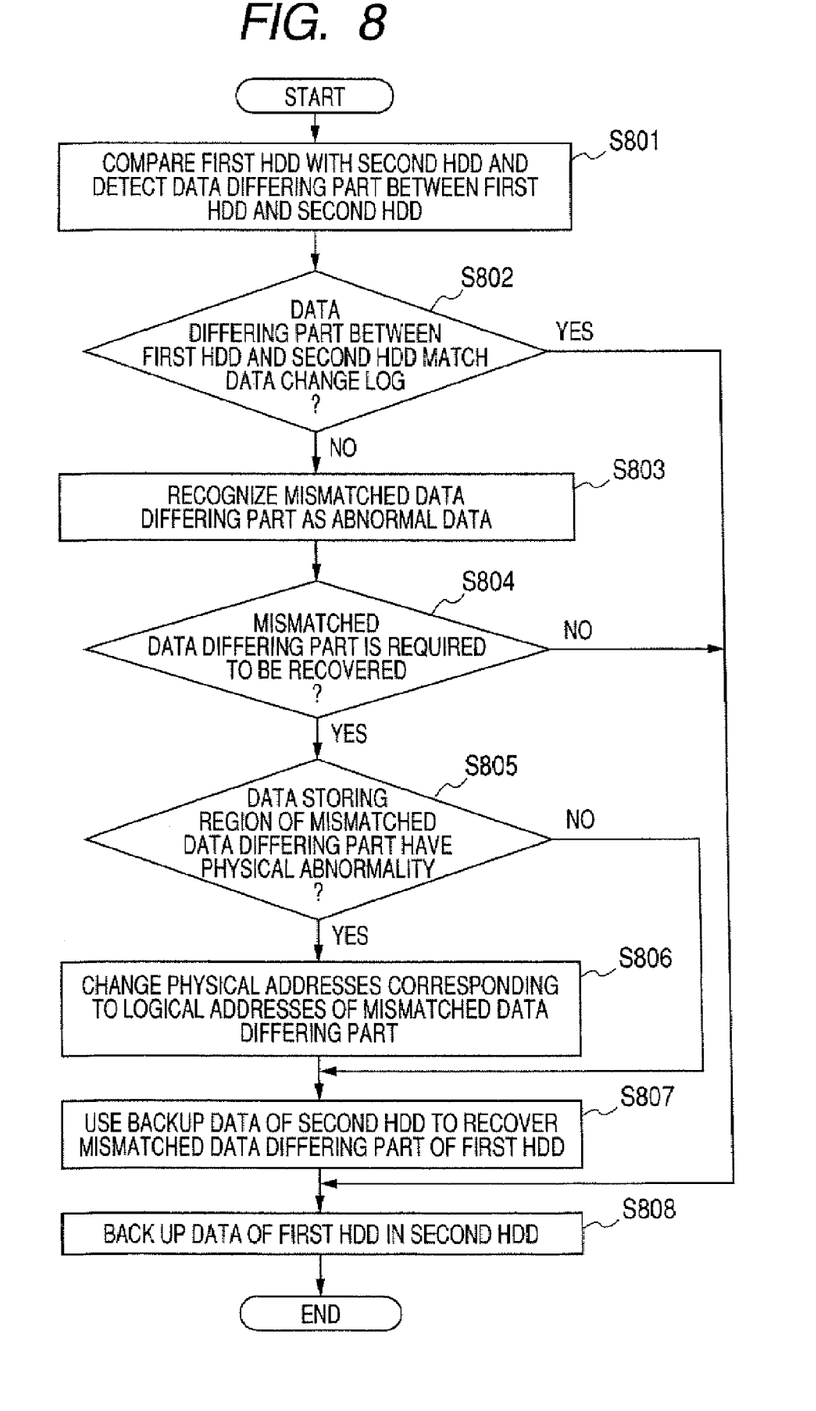
FIG. 8 is an exemplary flow chart showing a process of the data backup system according to the second embodiment.

In the second embodiment, the CPU 22 of the docking station 20 executes a backup program 23*a*. The backup program 23*a* includes a data recovery process. FIG. 8 shows a data recovery process performed by the docking station 20. The data recovery process will be described in detail with reference to FIG. 8.

When the personal computer 10 is connected to the docking station 20, the backup program 23*a* is executed by the CPU 22 and accordingly data of the first hard disk drive 13 are backed up into the second hard disk drive 21. Thereafter, the personal computer 10 is separated from the docking station 20 and is used alone. While the personal computer 10 is being used alone, the CPU 11 generates and accumulates a data change log specifying the data changed in the first hard disk drive 13 whenever the data of the first hard disk drive 13 is rewritten. The CPU 11 continues to accumulate the data change log until the next data backup.

When the personal computer 10 is again connected to the docking station 20, the CPU 22 automatically executes the backup program. At this time, the CPU 22 compares the data of the first hard disk drive 13 with the data of the second hard disk drive 21 and detects and extracts a difference between the data of the first hard disk drive 13 and the data of the second hard disk drive 21 (S801).

Next, the CPU 22 determines whether a data differing part matches the data change log (S802). In other words, the CPU 22 determines whether there exists a difference between data that should not be changed according to the data change log and data that actually have been changed. Here, if the data differing part matches the data change log, it may be said that the data differing part occurs when the data of the first hard disk drive 13 is normally rewritten. On the other hand, if the data differing part does not match the data change log, it may be said that the data differing part is attributable to abnormality of storage elements of the first hard drive 13 or abnormal rewriting of the data of the first hard disk drive 13.

When the data differing part matches the data change log, the CPU 22 proceeds to Step 808 where the data of the first hard disk drive 13 is backed up in the second hard disk drive 21 (S808), and then the process is terminated. On the other hand, when the data differing part does not match the data change log, the CPU 22 proceeds to Step 803 where a mismatched one of the data differing part is recognized as abnormal data (S803).

Next, the CPU 22 inquires whether the mismatched data differing part as abnormal data is required to be recovered (S804). More specifically, the CPU 22 instructs the CPU 11 to display, on the display, a selection screen for causing a user to select whether to recover or neglect the abnormal data. For example, the selection screen includes a button for selecting recovery of the abnormal data and a button for selecting negligence of the abnormal data. If the user selects the recovery of the abnormal data, the CPU 22 proceeds to Step 805. On the other hand, if the user selects the negligence of the abnormal data, the CPU 22 proceeds to Step 808 where the data of the first hard disk drive 13 is backed up in the second hard disk drive 21 (S808), and then the process is terminated.

In Step 805, the CPU 22 determines whether a data storing region storing the mismatched data differing part has a physical abnormality (S805). For example, the CPU 22 instructs the CPU 11 to attempt to rewrite data of the data storing region in order to determine the presence or absence of a physical abnormality in the data storing region. Here, if the rewriting of data of the data storing region is unsuccessful, it may be assumed that the data storing region has a physical abnormality. On the other hand, if the rewriting of data of the data storing region is successful, it may be assumed that the data storing region has no physical abnormality. If the data storing region storing the mismatched data differing part has a physical abnormality, the CPU 22 proceeds to Step 806. On the other hand, if the data storing region storing the mismatched data differing part has no physical abnormality, the CPU 22 proceeds to Step 807.

In Step 806, the CPU 22 instructs the CPU 11 to change physical addresses corresponding to logical addresses of the mismatched data differing part (S806). That is, since a part of the data storing region of the first hard disk drive 13 is a surplus part which is not used to store file data, program data and so on, physical addresses of the surplus part of the data storing region corresponds to logical addresses of the mismatched data differing part.

In Step 807, the CPU 22 uses backup data of the second hard disk drive 21 to recover the mismatched data differing part of the first hard disk drive 13 (S807). That is, the CPU 22 reads some of the backup data corresponding to the mismatched data differing part from the second hard disk drive 21 and then writes some of the backup data in the physical addresses newly corresponding to the mismatched data differing part in the first hard disk drive 13. This process allows the mismatched data differing part of the first hard disk drive 13 to be recovered.

In Step 808, the CPU 22 mirrors the data of the first hard disk drive 13 in order to generate the backup data in the second hard disk drive 21 (S808). This mirroring allows a copy of the data stored in the first hard disk drive 13 of the personal computer 10 to be generated in the second hard disk drive 21 of the docking station 20.

Although it has been illustrated in the above-described embodiments that the personal computer 10 is connected to the docking station 20 and the first hard disk drive 13 of the personal computer 10 is connected to the second hard disk drive 21 of the docking station 20, the present invention is not limited to this configuration. For example, the personal computer 10 may alternatively be connected to a USB memory, a selectable bay, an external storing device via a general-purposed interface, etc., instead of the docking station 20. In addition, the data storing devices mounted in the personal computer 10 and the docking station 20 may be different kinds of data storing devices such as optical disks, flash memories, silicon disks and so on, instead of the hard disks.

According to an aspect of the present invention, there is provided an information processing apparatus, a backup device and an information processing method, which are capable of specifying an abnormal part of data stored in a data storing unit.

What is claimed is:

1. An information processing apparatus having a data storage unit to store a data, comprising:
    a connector unit to which a backup storage apparatus provided separately from the information processing apparatus is connected;
    an accumulation unit that accumulates a data change log specifying a changed data in the data storage unit;
    a processor unit that backs up the data stored in the data storage unit into the backup storage apparatus, wherein the processor unit
        backs up the data stored in the data storage unit into the backup storage apparatus and then generates the data change log to accumulate into the accumulation unit;
        in a state where the backup storage apparatus is connected to the connector unit, compares the data stored in the data storage unit and a data stored in the backup storage apparatus and then detects a data differing portion of the data stored in the data storage unit, which is different from the data stored in the backup storage apparatus;
        determines whether or not the data differing portion matches the data change log accumulated in the accumulation unit; and
        if the data differing portion matches the data change log, backs up the data stored in the data storage unit into the backup storage apparatus, and if the data differing portion is a mismatch data differing portion that does not match the data change log, discriminates the mismatch data differing portion as an abnormal data.

2. The information processing apparatus according to claim 1 wherein the processor unit, if the mismatch data differing portion is discriminated as the abnormal data, recovers the mismatch data differing portion in the data storage unit by use of a backup data stored in the backup storage apparatus.

3. The information processing apparatus according to claim 2, wherein the processor unit changes a physical address corresponding to a logical address of the mismatch data differing portion; and
    writes the backup data corresponding to the mismatch data differing portion into a data storage area of a changed physical address.

4. The information processing apparatus according to claim 2, wherein the processor unit displays a selection screen to ask a user whether or not a recovering of the mismatch data differing portion is required.

5. A backup storage apparatus having a backup storage unit to store a data, comprising:
    a connector to which an information processing apparatus provided separately from the backup storage apparatus is connected;
    a processor unit that backs up a data stored in the information processing apparatus into the backup storage unit,
    wherein the information processing apparatus, after the data stored in the information processing apparatus is backed up into the backup storage unit, generates a data change log specifying a changed data in the information processing apparatus to accumulate into an accumulation unit provided in the information processing apparatus; and
    wherein the processor unit, in a state where the information processing apparatus is connected to the connector unit,
        (i) compares the data stored in the information processing apparatus and the data stored in the backup storage unit and then detects a data differing portion of the data stored in the information processing apparatus, which is different from the data stored in the backup storage unit,
        (ii) determines whether or not the data differing portion matches the data change log accumulated in the accumulation unit, and
        (iii) if the data differing portion matches the data change log, backs up the data stored in the information processing apparatus into the backup storage unit, and if the data differing portion is a mismatch data differing portion that does not match the data change log, discriminates the mismatch data differing portion as an abnormal data.

6. The backup storage apparatus according to claim 5, wherein the processor unit, if the mismatch data differing portion is discriminated as the abnormal data, recovers the mismatch data differing portion in the information processing apparatus by use of a backup data stored in the backup storage unit.

7. The backup storage apparatus according to claim 6, wherein the processor unit:
    changes a physical address corresponding to a logical address of the mismatch data differing portion; and
    writes the backup data corresponding to the mismatch data differing portion into a data storage of a changed physical address.

8. The backup storage apparatus according to claim 6, wherein the processor unit sends in instruction to the information processing apparatus to display a selection screen to ask a user whether or not a recovering of the mismatch data differing portion is required.

9. An information processing method performed by an information processing apparatus having a data storage unit to store a data
    wherein the information processing apparatus includes:
        a connector unit to which a backup storage apparatus provided separately from the information processing apparatus is connected;
        an accumulation unit that accumulates a data change log specifying a changed data in the data storage unit;
        a processor unit that backs up the data stored in the data storage unit into the backup storage apparatus, wherein the processor unit performs the following operations:
            storing the data stored in the data storage unit into the backup storage apparatus and then generating the data change log to accumulate into the accumulation unit;
            in a state where the backup storage apparatus is connected to the connector unit, comparing the data stored in the data storage unit and a data stored in the backup storage apparatus and then detecting a data differing portion of the data stored in the data storage unit, which is different from the data stored in the backup storage apparatus;
            determining whether or not the data differing portion matches the data change log accumulated in the accumulation unit; and
            if the data differing portion matches the data change log, storing the data stored in the data storage unit into the backup storage apparatus, and if the data differing portion is a mismatch data differing portion that does not match the data change log, discriminating the mismatch data differing portion as an abnormal data.

* * * * *